United States Patent [19]

Joyce

[11] Patent Number: 5,190,007
[45] Date of Patent: Mar. 2, 1993

[54] AIR INDUCTION SYSTEM FOR AN INTERNAL COMBUSTION ENGINE

[75] Inventor: Martin J. Joyce, Derbyshire, United Kingdom

[73] Assignee: Jaguar Cars Limited, United Kingdom

[21] Appl. No.: 827,643

[22] Filed: Jan. 29, 1992

[30] Foreign Application Priority Data

Jan. 31, 1991 [GB] United Kingdom ............... 9102121

[51] Int. Cl.[5] ................................ F02B 29/00
[52] U.S. Cl. ........................... 123/336; 261/23.2
[58] Field of Search ........ 123/52 M, 52 MV, 52 MC, 123/52 MB, 336; 261/23.2, 41.2

[56] References Cited

U.S. PATENT DOCUMENTS

| | | | |
|---|---|---|---|
| 2,317,625 | 4/1943 | Mallory | 261/41.2 |
| 3,596,642 | 8/1971 | Nakata | 123/336 |
| 4,109,634 | 8/1978 | Garabedian | 261/23.2 |
| 4,169,871 | 10/1979 | Eason | 261/23.2 |
| 4,491,106 | 1/1985 | Morris | 123/337 |
| 4,520,775 | 6/1985 | Nakamura | 123/308 |
| 4,683,855 | 8/1987 | Laimbock | 123/336 |
| 4,803,961 | 2/1989 | Hiraoka et al. | 123/52 MV |
| 4,919,087 | 4/1990 | Ogami et al. | 123/52 MV |
| 5,036,816 | 8/1991 | Mann | 123/336 |
| 5,054,439 | 10/1991 | Akagi et al. | 123/52 M |
| 5,056,472 | 10/1991 | Kurokawa et al. | 123/52 MV |

FOREIGN PATENT DOCUMENTS

| | | |
|---|---|---|
| 0367150 | 10/1989 | European Pat. Off. . |
| 2-41924 | 9/1990 | Japan ............... 123/52 M |
| 2117043 | 10/1983 | United Kingdom ........ 123/52 MB |
| 2180594 | 4/1987 | United Kingdom . |
| 2219829 | 12/1989 | United Kingdom . |

OTHER PUBLICATIONS

Japanese A-62 055 416 (Mazda Motor Corporation) 11 Mar. 1987.

Primary Examiner—David A. Okonsky
Attorney, Agent, or Firm—Davis, Bujold & Streck

[57] ABSTRACT

An air induction system for an internal combustion engine has a dual choke inlet, a spindle passes diametrically across both chokes, a pair of throttle blades are secured to the spindle for rotation therewith, each throttle blade being located in a different one of the chokes, the throttle blades being angularly offset from each other.

8 Claims, 3 Drawing Sheets

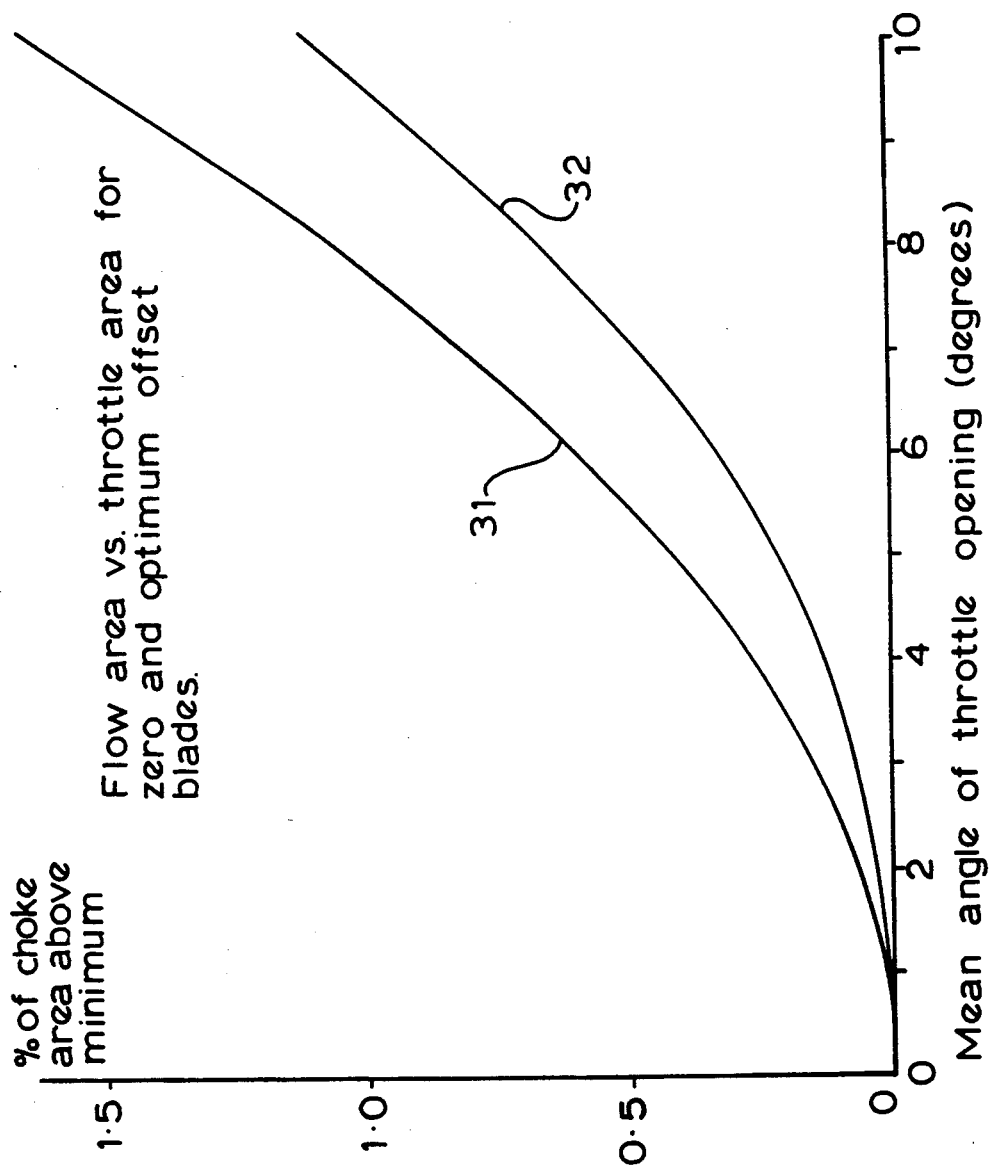

AIR INDUCTION SYSTEM FOR AN INTERNAL COMBUSTION ENGINE

BACKGROUND TO THE INVENTION

The invention relates to air induction systems for internal combustion engines. The invention is concerned particularly but not exclusively with such systems for multi-cylinder fuel-injection spark-ignition engines.

As engine management control systems become more sophisticated it becomes more important to be able to provide accurate control for the air flow rate into an engine, particularly when the engine is idling or operating with a very low load. The conventional kind of air control comprises a choke in an air flow passage leading to the engine and a throttle blade mounted in the choke and rotatable between a closed position transverse to the air flow direction and an open position parallel to the air flow direction. Some engines have more than one choke in which case the throttle blades may be mounted on a common spindle for movement in unison.

One problem which can arise in such a system is that for very small throttle openings the variation in air flow for a given throttle angle movement is too great to allow the required degree of sensitivity in the system as a whole. An object of the present invention is to provide a system which can give increased sensitivity, namely smaller changes in air flow for a given throttle movement at small throttle openings than with a conventional system.

SUMMARY OF THE INVENTION

According to the present invention an air induction system for an internal combustion engine comprises a dual choke inlet with a pivotal throttle blade in each choke, the throttle blades being mounted for rotation together on a common spindle, the throttle blades being angularly offset one from the other.

In this way, there is a range of openings around the nominally closed position at which one choke is being closed as the other is being opened. In this range and for small throttle openings in general, the change in total air flow for a given angular movement of the throttle blades is smaller than with two throttle blades acting in unison.

The common spindle may be controlled by a motor responsive primarily to the position of a driver operable accelerator control.

Preferably the air induction system is used with a multi-cylinder engine in which case each choke leads to a respective separate plenum and each plenum feeds a separate set of the cylinders. In a V-engine, each set of cylinders may be one bank of the V. A gate valve may be arranged between the two plenums and should be selectively openable to balance air flow to the two sets of cylinders. This function is particularly useful at very small throttle openings when the air flow through one choke is substantially different from that through the other choke.

The offset may be of the order of a few degrees and typically should be in the range 3° to 10°, preferably 4° to 6°. Typically a spindle passes diametrically across both chokes; in this case, the blades in the fully open state should have equal and opposite inclinations to the air flow direction which are sufficiently small to avoid any significant increase in flow resistance due to blade inclination compared with the resistance of the spindle.

While the invention is intended primarily for use with fuel-injection spark-ignition internal combustion engines, it could be used with other arrangements such as with compression ignition engines or even with carburettor engines.

An embodiment of the invention will now be described, by way of example, with reference to the accompanying drawings in which:

BRIEF DESCRIPTION OF THE DRAWINGS

FIG. 4 is a graphical representation showing the effective flow area variation for various throttle angles with the system as shown in FIGS. 1 to 3 as compared with a conventional system with parallel throttle blades.

DESCRIPTION OF A PREFERRED EMBODIMENT

Figure 1:
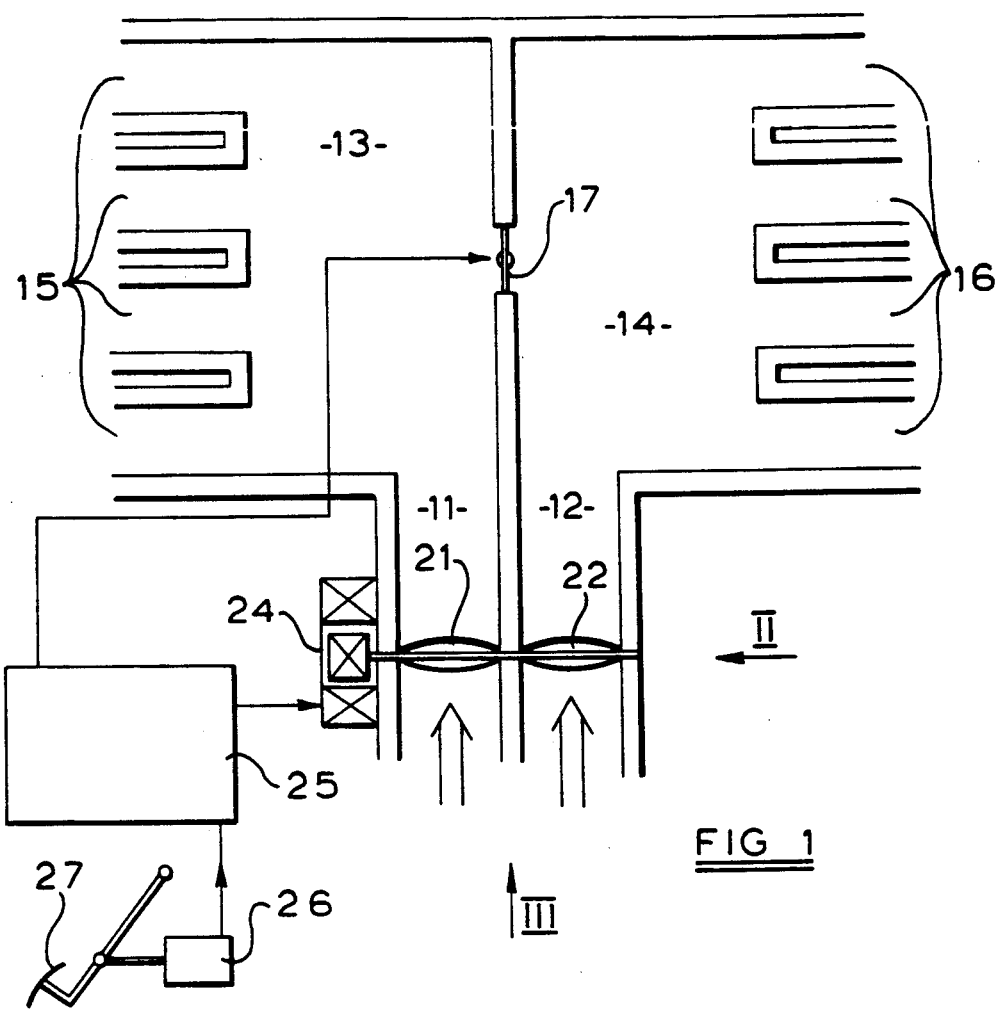
FIG. 1 is a diagrammatic representation of an air induction system for a multi-cylinder engine of V-eight configuration.

FIG. 1 shows diagrammatically an air induction system for a V-eight cylinder fuel-injection internal combustion engine. Twin chokes 11 and 12 provide air inlet passages to two plenums 13 and 14. Plenum 13 is connected to a series of ports 15 each leading to a cylinder in a left hand bank of four cylinders. Similarly plenum 14 leads to four ports 16 for the four cylinders in the right hand bank.

A control gate 17 in the form of a pivoting blade valve or a similar control valve is arranged to control communication between the two plenums 13 and 14.

Figure 2:
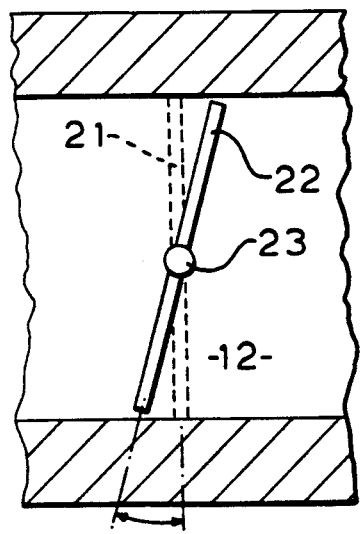
FIG. 2 is a diagrammatic sectional side elevation of part of FIG. 1 on a larger scale in the direction of arrow II.
Figure 3:
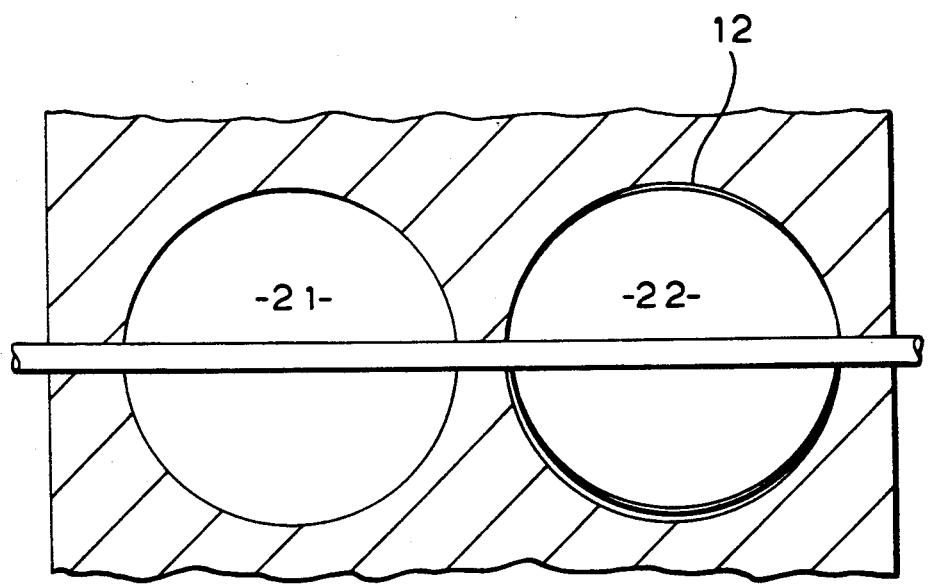
FIG. 3 is a view of the corresponding parts of FIG. 1 in the direction of arrow III.

Control of air flow through the chokes 11 and 12 is by means of conventional pivoting throttle blades as shown in greater detail in FIGS. 2 and 3. A blade 21 in choke 11 and a blade 22 in choke 12 are both mounted on a common spindle 23 passing through the two chokes. As seen in FIG. 2, the blade 22 is offset through a small angle with respect to the blade 21. For clarity of illustration the angle is shown as about 10° but 5° would be more typical. The effect of this offset will be discussed subsequently.

As shown in FIG. 1, the rotational position of spindle 23 and thus of the blades 21 and 22 is controlled by an electric servo motor 24 which in turn receives control signals from a control unit 25 influenced primarily by a transducer 26 responsive to the position of a driver's accelerator pedal 27. In practice the control unit 25 is part of or connected to an engine management system which contributes to the throttle position signal applied to motor 24. In this way factors such as engine temperature and engine speed can also be employed to influence throttle opening. Control unit 25 may also be provided with a further control output for opening and closing gate 17.

The effect of the mutual inclination of the two throttle blades will now be described with reference to FIGS. 2 and 4. For comparison purposes, curve 31 in FIG. 4 shows the relationship of flow area through the chokes to the angle of throttle opening for a system with parallel throttle blades. Flow rate does not correspond exactly to flow area but in general increases broadly in line with flow area so a plot of flow area against throttle angle opening gives a broad indication of flow rate against throttle opening for a given pressure differential. It is usual to provide a small clearance between the throttle blade and the choke giving a minimum opening which is perhaps 60 to 80% of the smallest opening required in use of the engine. Curve 31 shows the increase from this minimum. Because a throttle blade has a finite thickness no significant increase in area occurs for very small movements over which the blade continues to close off a radial plane. The datum angle for curve 31 is taken as the angle at which significant opening begins to occur.

Curve 32 shows the corresponding relationship between flow area and throttle opening when the two blades are offset at a total included angle of 4°. With this arrangement, the minimum opening is achieved when the two throttle blades have equal and opposite inclinations. With a 4° included angle the minimum flow rate corresponds to $+2°$ for one blade and $-2°$ for the other blade. This position is taken as the datum representing 0° or a closed throttle. The minimum opening is not significantly greater than that for a single throttle blade because of the effect of blade thickness. During the first 2° of throttle opening, one blade is closing while the other is opening which results in a significant increase in area for the opening blade but a much lower and possibly insignificant rate of closure for the other blade. The net increase is at a much lower rate than with parallel throttle blades as shown for curve 31. For larger throttle openings, curve 32 tends to become parallel to curve 31 with the result that during normal power-on conditions the small offset of the blades has no practical effect. Of course, at full throttle, that is 90° opening, the individual blades have equal and opposite inclinations to the air flow direction, that is the angles of the two offset blades are 88° and 92°. However, due to partial closure of the choke by the throttle spindle, the flow rate at 88° or 92° is only insignificantly different from that at 90° so there is no measurable loss in performance at full throttle.

When operating with small throttle openings, the air flow through the chokes to one of the plenums 13, 14 is much greater than that to the other plenum. To balance the flow to the engine cylinders, the gate 17 is opened and compensatory air flow through the gate takes place. The gate may be selectively opened at other engine operating conditions in accordance with normal practice for gates of this kind.

The included angle between the blades selected at the design stage should be sufficiently small to ensure that the minimum flow rate at nominally closed throttle is less than the smallest degree of throttle opening which will ever be required in operation of the engine. Similarly it should be sufficiently small to ensure no significant power loss at full throttle. On the other hand, the angle should be sufficiently large to provide a shallower inclination for curve 32 than for curve 31 for flow areas at which very fine control is required. Generally, the lowest throttle opening required in practice is at engine idle so the flow rate at nominally closed throttle should be a little below the minimum flow rate required in any conditions at engine idle.

The invention may also be employed with engines which have only a single bank of cylinders fed from a single plenum. In this case the two chokes would connect into the same plenum.

I claim:

1. An air induction system for an internal combustion engine comprising a dual choke inlet with a pivotal throttle blade in each choke, the throttle blades being mounted for rotation together on a common spindle, the throttle blades being angularly offset from each other.

2. An air induction system as claimed in claim 1 wherein the common spindle is controlled by a motor responsive primarily to signals representative of the position of a driver operable accelerator control.

3. An air induction system as claimed in claim 1 wherein the system is used in conjunction with a multi-cylinder engine and wherein each choke leads to a respective separate plenum and each plenum feeds one set of cylinders.

4. An air induction system as claimed in claim 3 wherein a gate valve is arranged between the two plenums and is selectively openable to balance air flow to the two sets of cylinders at small throttle openings.

5. An air induction system as claimed in claim 1 wherein the offset angle between the two blades is between 3° and 10°.

6. An air induction system as claimed in claim 5 wherein the offset angle is between 4° and 6°.

7. An air induction system according to claim 1 wherein the spindle passes diametrically across both chokes and in the fully open state the blades have equal and opposite inclinations to air flow which are sufficiently small to avoid any significant increase in flow resistance over that of the spindle.

8. An air induction system as claimed in claim 1 for use with a fuel-injection multi-cylinder spark-ignition engine.

* * * * *